Dec. 18, 1956  P. PROFOS  2,774,731

METHOD FOR DEGASIFYING WATER

Filed Dec. 10, 1953

INVENTOR.
PAUL PROFOS.
BY K. A. Mayr
ATTORNEY.

ABCUnited States Patent Office 2,774,731
Patented Dec. 18, 1956

2,774,731
METHOD FOR DEGASIFYING WATER

Paul Profos, Winterthur, Switzerland, assignor to Sulzer Freres, Societe Anonyme, Winterthur, Switzerland, a corporation of Switzerland Application December 10, 1953, Serial No. 397,382

Claims priority, application Switzerland December 18, 1952

3 Claims. (Cl. 210—15)

The present invention relates to a method for degasifying water, particularly make-up water for steam power plants.

It is an object of the present invention to transfer the heat needed for degasifying water by expansion, which water has been purified by ion exchange, to the water in two stages at different temperature levels. Turbine exhaust steam of the steam power plant is preferably used as source of heat for one of the heating stages and turbine bleeder steam is preferably used for the other heating stage. It may be of advantage to transfer at least a part of the heat removed from the water before the ion exchange, to the water in one of the heating stages.

When preparing make-up water for steam plants, it must be considered that the process performed in the ion exchange plants does not reduce the gas content of the water. It may happen that water prepared by ion exchange may be very rich in oxygen, particularly if surface water is used or if the water is taken directly from the ground. Degasification of such water before feeding it into the boiler system is essential, in order to avoid corrosion in the steam plants which is primarily caused by the content of the make-up water of gases which do not ionize, particularly oxygen.

The invention provides degasification by simple means by preheating the make-up water before it is fed into the boiler system to such a degree that the water is easily and completely degasified in a condenser.

Figure 1:
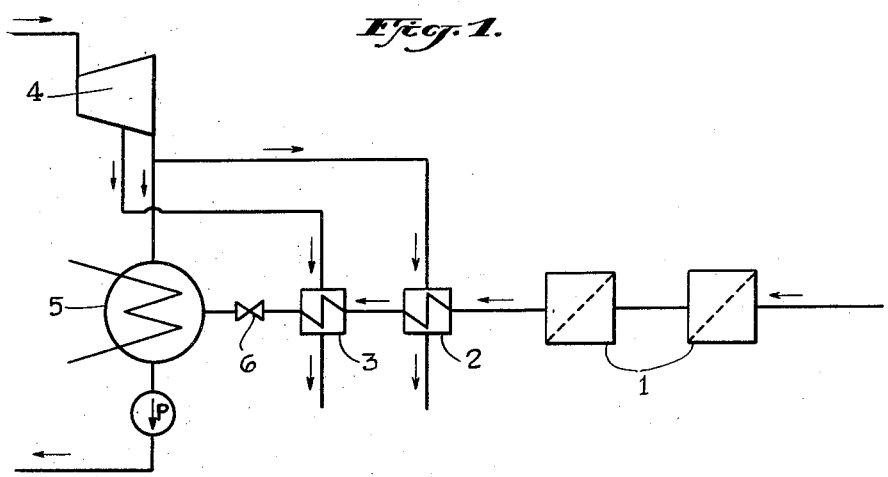
Figure 2:
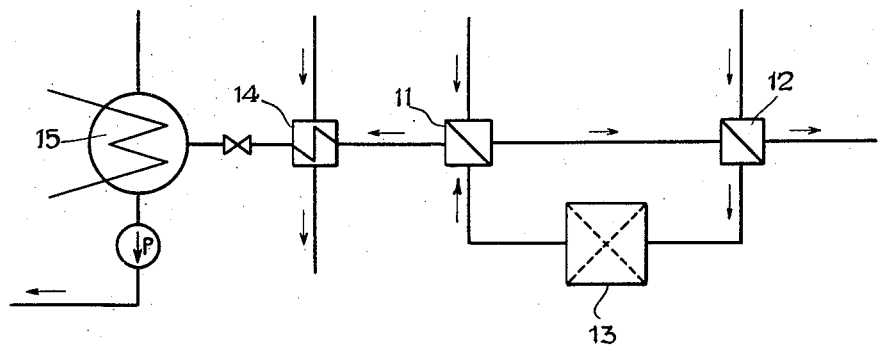

The novel features which are considered characteristic of the invention are set forth with particularity in the appended claims. The invention itself however and additional objects and advantages thereof will best be understood from the following description of two embodiments thereof when read in connection with the accompanying drawing in which Fig. 1 is a diagrammatic illustration of a system according to the invention;

Fig. 2 is a diagrammatic illustration of a modified system according to the invention.

Referring more particularly to the drawing, numeral 1 designates a desalting plant which operates on the two-bed system. Numerals 2 and 3 designate preheaters, numeral 4 designates a condensing turbine and numeral 5 a condenser. The pure water coming from the desalting plant is usually so cold that it cannot readily be expanded. Therefore, the pure water is preheated by exhaust steam of the turbine 4 in a preheater 2. The preheated water passes through a second preheater (3) in which it is additionally heated by steam bled from the turbine 4. Thereby the heat-content of the pure water is sufficiently increased to afford expansion at its entry into the condenser 5, if desired, after passing a throttle valve 6. Objectionable gases are thereby completely removed. The so degasified water can be conducted as feed water into the steam plant, without danger of corrosion. Instead of using exhaust or bleeder steam from turbines as a source of heat, any other suitable medium may be used, for example stuffing box steam, steam from a deaerator or blow down water, if it is sufficiently hot.

Figure 2 illustrates a plant for preparing boiler feed water in which the heat taken from the water before the ion exchange is at least partly reintroduced into the water. Numeral 11 designates a heat exchanger, 12 a cooler, and 13 an ion exchange plant. Numeral 14 designates a preheater and numeral 15 a condenser of a turbine, not shown. The make-up water, which must be cooled to the temperature required for the ion exchange process in the plant 13, passes through the heat exchanger 11 in which it transfers at least a part of its heat to the cool pure water coming from the ion exchange plant 13. The so precooled water passes through the cooler 12 in which it is additionally cooled to the temperature required for the exchange process in the desalting plant 13. Since the pure water leaving the exchange plant 13 has received a considerable part of its original heat content in the heat exchanger 11, only the heat missing for the degasification by expansion need be added in the preheater 14. Supply of this heat in the preheater 14 is only necessary if the heat received by the purified water in the heat exchanger 11 is insufficient for the degasification process. After degasification in the condenser 15, the water can be used without further treatment as additional feed water for the steam plant. In the aforedescribed process only that part of the added heat is lost which is needed for heating the water higher than the temperature of the turbine condensate. This part is in most cases very small.

What is claimed is:

1. A method of degasifying water, particularly boiler feed water in a steam power plant, which water has been purified by ion exchange, comprising transferring heat to the water in at least two consecutive heating stages by heat carriers having different specific heat contents and expanding the so heated water for releasing undesired gases, the amount of heat which is transferred to the water being determined by the expansion pressure and by the amount and type of gas to be removed from the water.

2. A method as defined in claim 1 in which the heat carrier of one of said heating stages is turbine exhaust steam of the steam power plant and the heat carrier of the other of said heating stages is turbine bleeder steam.

3. A method of degasifying water which has been cooled and desalted by ion exchange comprising the steps of transferring heat to the water in at least two consecutive heating stages by heat carriers having different specific heat contents and expanding the so heated water for releasing undesired gases, the heat carrier of one of said stages being the water before it is purified by ion exchange, the heat being transferred to the water in all heating stages in an amount for raising the temperature of the desalted water to that at which the gas is released in said expanding step.

References Cited in the file of this patent

UNITED STATES PATENTS

| | | |
|---|---|---|
| 977,578 | Wilkinson | Dec. 6, 1910 |
| 1,060,901 | Hodges | May 6, 1913 |
| 1,091,919 | Faget | Mar. 31, 1914 |
| 2,101,197 | Rice | Dec. 7, 1937 |
| 2,210,151 | Rohlin | Aug. 6, 1940 |
| 2,359,902 | Dahlberg | Oct. 10, 1944 |